US009262202B2

(12) United States Patent
Tripp

(10) Patent No.: US 9,262,202 B2
(45) Date of Patent: **\*Feb. 16, 2016**

(54) HYBRID DEPENDENCY ANALYSIS USING DYNAMIC AND STATIC ANALYSES

(71) Applicant: International Business Machines Corporation, Armonk, NY (US)

(72) Inventor: Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/012,316

(22) Filed: Aug. 28, 2013

(65) Prior Publication Data

US 2014/0181836 A1    Jun. 26, 2014

Related U.S. Application Data

(63) Continuation of application No. 13/723,669, filed on Dec. 21, 2012, now Pat. No. 8,893,101.

(51) Int. Cl.
*G06F 9/45* (2006.01)
*G06F 9/46* (2006.01)
*G06F 9/48* (2006.01)
*G06F 9/44* (2006.01)

(52) U.S. Cl.
CPC *G06F 9/46* (2013.01); *G06F 8/433* (2013.01); *G06F 8/73* (2013.01); *G06F 9/4843* (2013.01); *G06F 8/4436* (2013.01)

(58) Field of Classification Search
CPC .................. G06F 8/433–8/434; G06F 8/4436

USPC .................................................. 717/152–157
See application file for complete search history.

(56) References Cited

U.S. PATENT DOCUMENTS

| 5,903,749 | A  | * | 5/1999 | Kenner et al. ................ 712/226 |
| 7,076,493 | B2 | * | 7/2006 | Myers ............... G06F 17/30595 707/749 |
| 7,246,056 | B1 | * | 7/2007 | Brewton ............. G06F 17/5009 703/20 |
| 7,392,514 | B2 | * | 6/2008 | Edwards ....................... 717/156 |

(Continued)

FOREIGN PATENT DOCUMENTS

WO    2010140883 A2    12/2010

OTHER PUBLICATIONS

Relative Completeness of Abstraction Refinement for Software Model Checking—Thomas Ball, Andreas Podelski, and Sriram K. Rajamani—Microsoft Research Max-Planck-Institut fur Informatik—2002.*

(Continued)

*Primary Examiner* — Jason Mitchell
*Assistant Examiner* — Francisco Aponte
(74) *Attorney, Agent, or Firm* — Brian J. Colandreo, Esq.; Jeffrey T. Placker, Esq.; Holland & Knight LLP

(57) ABSTRACT

A method, computer program product, and system for performing a hybrid dependency analysis is described. According to an embodiment, a method may include computing, by one or more computing devices, one or more dynamic hints based on a finite set of executions of a computer program. The method may further include performing, by the one or more computing devices, a hybrid dependence analysis of one or more statements of the computer program.

7 Claims, 5 Drawing Sheets

(56) References Cited

U.S. PATENT DOCUMENTS

| | | | |
|---|---|---|---|
| 7,624,075 B2* | 11/2009 | Lucco | G06F 17/30961 706/12 |
| 7,627,671 B1* | 12/2009 | Palma et al. | 709/224 |
| 8,046,752 B2 | 10/2011 | Chilimbi et al. | |
| 8,316,345 B2* | 11/2012 | Gulwani et al. | 717/104 |
| 8,332,864 B2* | 12/2012 | Bose | G06Q 10/06 718/100 |
| 8,584,099 B1* | 11/2013 | Abi-Antoun et al. | 717/131 |
| 2009/0132991 A1 | 5/2009 | Ganai et al. | |
| 2010/0274972 A1 | 10/2010 | Babayan et al. | |
| 2011/0219361 A1 | 9/2011 | Dolby et al. | |
| 2011/0289507 A1 | 11/2011 | Khan et al. | |
| 2011/0302559 A1 | 12/2011 | Naik | |
| 2012/0144376 A1* | 6/2012 | Van Eijndhoven et al. | 717/146 |
| 2012/0311711 A1* | 12/2012 | Amit et al. | 726/25 |
| 2012/0311713 A1* | 12/2012 | Amit et al. | 726/25 |
| 2014/0130015 A1* | 5/2014 | Beskrovny et al. | 717/124 |
| 2014/0130019 A1* | 5/2014 | Beskrovny et al. | 717/131 |

OTHER PUBLICATIONS

Hybrid Analysis: Static & Dynamic Memory Reference Analysis—Silvius Rus, Lawrence Rauchwerger, and Texas A&M University. Department of Computer Science, Texas A&M University, College Station, Texas—Jay Hoeflinger—Intel-KAI Corporation—International Journal of Parallel Programming, vol. 31, No. 4, Aug. 2003.*

Safe Parallel Programming using Dynamic Dependence Hints—Chuanle Ke and Lei Liu—Institute of Computing Technology, Chinese Academy of Sciences, Chao Zhang—Intel Labs, China, Tongxin Bai, Bryan Jacobs, and Chen Ding—University of Rochester—OOPSLA'11, Oct. 22-27, 2011.*

Combined Static and Dynamic Analysis for Inferring Program Dependencies Using a Pattern Language—Inbal Ronen, Sara Porat, Yael Dubinsky—IBM Haifa Research Lab, Nurit Dor—Panaya Inc—2006 Inbal Ronen.*

A hybrid analysis framework for detecting web application vulnerabilities—Mattia Monga, Roberto Paleari, Emanuele Passerini—Universita degli Studi di Milano Milano, Italy—SESS'09, May 19, 2009, Vancouver, Canada.*

Monga et al., "A Hybrid Analyisis Framework for Detecting Web Application Vulnerabilities," SESS '09, May 19, 2009, IEEE, ICSE '09 Workshop, pp. 25-32.

Ronen et al., "Combined Static and dynamic analysis for Inferring Program Dependencies Using a Pattern Language," IBM Haifa Research Lab, Mount Carmel, Haifa 31905, Israel—2006, pp. 1-12.

Ball et al., "Relative Completeness of Abstraction Refinement for Software Model Checking," TACAS 2002, pp. 158-172.

Ke et al., "Safe Parallel Programming Using Dynamic Dependence Hints," OOPSLA 2011, Oct. 22-27, 2011, pp. 243-258.

Rus et al., "Hybrid Analysis: Static & Dynamic Memory Reference Analysis," International Journal of Parallel Programming, vol. 31, No. 4, Aug. 2003, pp. 251-283.

Ronen et al., "Combined Static and Dynamic Analysis of Inferring Program Dependencies Using a Pattern Language," IBM Haifa Research Lab, IL, copyright 2006, pp. 1-12.

Monga et al., "A Hybrid Analysis Framework for Detecting Web Application Vulnerabilities," SESS '09, May 19, 2009, Canada, IEEE, ICSE '09 Workkshop, pp. 25-32.

Ke et al., "Safe Parallel Programming Using Dynamic Dependence Hints," OOPSLA 2011, Oct. 22-27, 2011, pp. 1-12.

Rus et al., "Hybrid Dependence Analysis for Automatic Parallelization," Texas A&M University Nov. 21, 2005, pp. 1-22.

Livshits, "Improving Software Security with Precise Static and Runtime Analysis," Stanford University, Dec. 2006, 1-229.

Kim et al., "SD3: A Scalable Approach to Dynamic Data-Dependence Profiling," 43rd Annual IEEE/ACM Int. Symposium on Microarchitecture (MICRO), Dec. 2010, pp. 1-12.

* cited by examiner

9,262,202 B2

HYBRID DEPENDENCY ANALYSIS USING DYNAMIC AND STATIC ANALYSES

RELATED APPLICATIONS

The subject application is a continuation application of U.S. patent application Ser. No. 13/723,669, filed on Dec. 21, 2012, now U.S. Pat. No. 8,893,101, the entire content of which is herein incorporated by reference.

TECHNICAL FIELD

This disclosure relates to dependency analysis of computer data.

BACKGROUND

Various analyses may be performed on computer statements that may allow users to determine characteristics of the program that would prevent pitfalls in situations such as security parallelization and refactoring. Data-flow analysis may generally relate to gathering information about the set of possible data values calculated at various points in a computer program. A basic form of data-flow analysis is data dependence analysis, which only establishes data dependencies between program locations without considering data values.

BRIEF SUMMARY OF THE DISCLOSURE

According to a first aspect of the disclosure, a computer-implemented method includes computing, by one or more computing devices, one or more dynamic hints based on a finite set of executions of a computer program. The method also includes performing, by the one or more computing devices, a hybrid dependence analysis of one or more statements of the computer program.

One or more of the following features may be included. Performing the hybrid dependence analysis may be a combination of performing a dynamic analysis and performing a sound static analysis. The one or more dynamic hints may be used to perform the sound static analysis. Performing the sound static analysis may include performing a specialized static abstraction based on the one or more dynamic hints. The one or more dynamic hints may be produced by the dynamic analysis. The dynamic analysis may be performed on one or more dynamic executions of the computer program, using one or more inputs to the computer program. Computing the one or more dynamic hints may further include performing one or more dependency queries that determine whether at least one statement of the one or more statements of the computer program may be dependent on at least another statement of the one or more statements of the computer program. Each of the one or more dependency queries may produce a result that may be a positive result or may be a negative result. The positive result may indicate dependence between the one or more statements involved in the hybrid dependence analysis. The negative result may indicate independence between the one or more statements involved in the hybrid dependence analysis. Performing the specialized static abstraction based on the one or more dynamic hints may include using memory locations involved during the one or more dependency queries of a subset of the one or more statements of the computer program that may produce the negative result.

According to another aspect of the disclosure, a computer program product resides on a computer readable storage medium and has a plurality of instructions stored on it. When executed by a processor, the instructions cause the processor to perform operations including computing one or more dynamic hints based on a finite set of executions of a computer program. Instructions may be included for performing a hybrid dependence analysis of one or more statements of the computer program.

One or more of the following features may be included. Performing the hybrid dependence analysis may be a combination of performing a dynamic analysis and performing a sound static analysis. The one or more dynamic hints may be used to perform the sound static analysis. Performing the sound static analysis may include performing a specialized static abstraction based on the one or more dynamic hints. The one or more dynamic hints may be produced by the dynamic analysis. The dynamic analysis may be performed on one or more dynamic executions of the computer program, using one or more inputs to the computer program. Computing the one or more dynamic hints may further include performing one or more dependency queries that determine whether at least one statement of the one or more statements of the computer program may be dependent on at least another statement of the one or more statements of the computer program. Each of the one or more dependency queries may produce a result that may be a positive result or may be a negative result. The positive result may indicate dependence between the one or more statements involved in the hybrid dependence analysis. The negative result may indicate independence between the one or more statements involved in the hybrid dependence analysis. Performing the specialized static abstraction based on the one or more dynamic hints may include using memory locations involved during the one or more dependency queries of a subset of the one or more statements of the computer program that may produce the negative result.

According to another aspect of the disclosure, a computing system includes at least one processor and at least one memory architecture coupled with the at least one processor. The computing system also includes a first software module executable by the at least one processor and the at least one memory architecture. The first software module is configured to perform a hybrid dependence analysis of one or more statements of a computer program. The computing system also includes a second software module executable by the at least one processor and the at least one memory architecture. The second software module is configured to compute one or more dynamic hints based on a finite set of executions of the computer program.

One or more of the following features may be included. Performing the hybrid dependence analysis may be a combination of performing a dynamic analysis and performing a sound static analysis. The one or more dynamic hints may be used to perform the sound static analysis. Performing the sound static analysis may include performing a specialized static abstraction based on the one or more dynamic hints. The one or more dynamic hints may be produced by the dynamic analysis. The dynamic analysis may be performed on one or more dynamic executions of the computer program, using one or more inputs to the computer program. Computing the one or more dynamic hints may further include performing one or more dependency queries that determine whether at least one statement of the one or more statements of the computer program may be dependent on at least another statement of the one or more statements of the computer program. Each of the one or more dependency queries may produce a result that may be a positive result or may be a negative result. The positive result may indicate dependence between the one or more statements involved in the hybrid dependence analysis. The negative result may indicate independence between the one or more statements involved in the hybrid dependence analysis. Performing the specialized static abstraction based on the one or more dynamic hints may include using memory locations involved during the one or more dependency queries of a subset of the one or more statements of the computer program that may produce the negative result.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
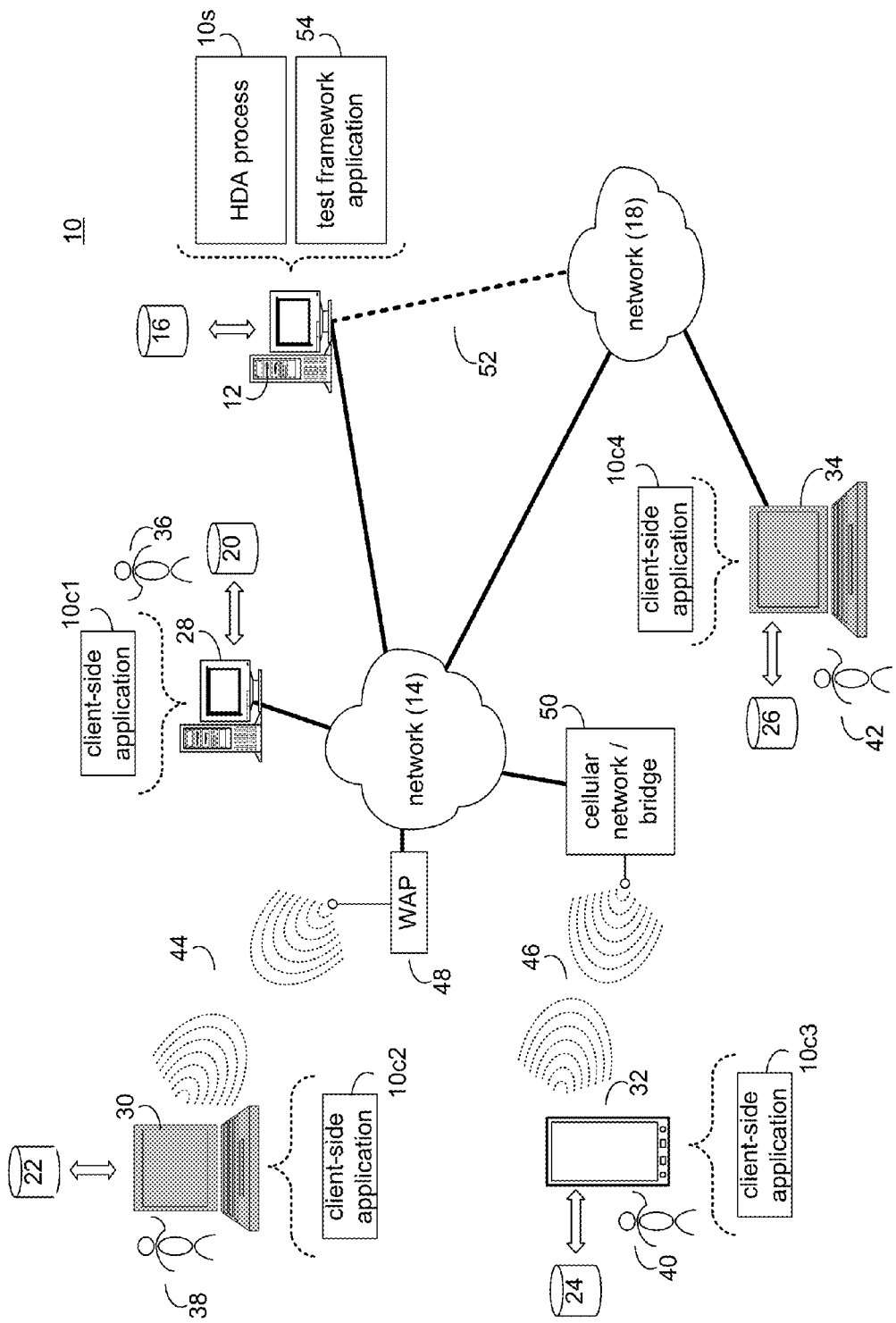
FIG. 1 is a diagrammatic view of a hybrid dependency analysis process coupled to a distributed computing network.

According to some example implementations consistent with the present disclosure, users of a software program may want to determine whether statements in a software program are dependent on one another. For example, it may be beneficial for a user to know if one statement in the software program may modify another software program statement. Data-flow analysis is generally the problem of gathering information about the set of possible data values calculated at various points in a computer program. One basic form of dependence analysis, which only establishes data dependencies between program locations without considering data values, is called data dependence analysis. A data dependency may generally include a situation in which a program statement or instruction refers to the data of a preceding statement. In compiler theory, a technique used to discover data dependencies among statements is called dependence analysis. Information about data dependencies may be useful for many situations such as security, parallelization and refractoring. It is understood that although security, parallelization and refractoring are listed as examples of possible uses of dependency analysis, this is only for illustrative purposes only and other situations may be benefited from the dependence analysis.

Security, as mentioned above, may generally relate to integrity and confidentiality violations, for example, where data either flows from an untrusted location to a trusted location (integrity) or vice versa (confidentiality) in web applications for example. Cross-site scripting (XSS) and SQL injection (SQLi) are two examples of integrity violations. Information leakage (where, e.g., an SQL exception is reported to the user in a detailed manner) is an example of a confidentiality violation. The vulnerability may be due to flow of data between two program locations that differ in terms of their security classification. Testing whether there is data dependence between these locations may thus provide a direct answer to the security query.

For parallelization, the data-dependence relation between operations may be a safe approximation of the binary commutativity property: If there is no dependence path connecting between operations $O_1$ and $O_2$, then these operations commute, and moreover, they can be run in parallel. In mathematics, a binary operation is commutative if changing the order of the operands does not change the result. This may result from the disjoint concurrency property that holds in the absence of data dependencies, and may be stronger than commutativity. In disjoint concurrency, programs may be constructed so that they do not ever attempt to access the same memory locations. The parallel thread programming construct C1//C2 is used to denote the creation of two threads, C1 and C2, which are then executed in parallel. For example, a loop can be parallelized if there are no loop-carried dependencies between its iterations, which amount to testing for data dependencies between program locations from distinct iterations.

Refactoring may be a disciplined technique for restructuring an existing body of code, for example by altering the internal structure of the body of code without changing its external behavior. Advantages of refactoring may include improved code readability and reduced complexity to improve the maintainability of the source code. Many refactoring techniques may rely on code motion, the ability to move a program statement to a new location. Code motion may be predicated on the assumption that the moved statement commutes with the operations it changed order with.

Referring to FIG. 1, there is shown hybrid dependency analysis (HDA) process 10. For the following discussion, it is intended to be understood that HDA process 10 may be implemented in a variety of ways. For example, HDA process 10 may be implemented as a server-side process, a client-side process, or a server-side/client-side process.

For example, HDA process 10 may be implemented as a purely server-side process via HDA 10s. Alternatively, HDA process 10 may be implemented as a purely client-side process via one or more of client-side application 10c1, client-side application 10c2, client-side application 10c3, and client-side application 10c4. Alternatively still, HDA process 10 may be implemented as a server-side/client-side process via HDA process 10s in combination with one or more of client-side application 10c1, client-side application 10c2, client-side application 10c3, and client-side application 10c4. In such an example, at least a portion of the functionality of HDA process 10 may be performed by HDA 10s and at least a portion of the functionality of HDA process 10 may be performed by one or more of client-side application 10c1, 10c2, 10c3, and 10c3.

Accordingly, HDA process 10 as used in this disclosure may include any combination of HDA process 10s, client-side application 10c1, client-side application 10c2, client-side application 10c3, and client-side application 10c4.

Figure 2:
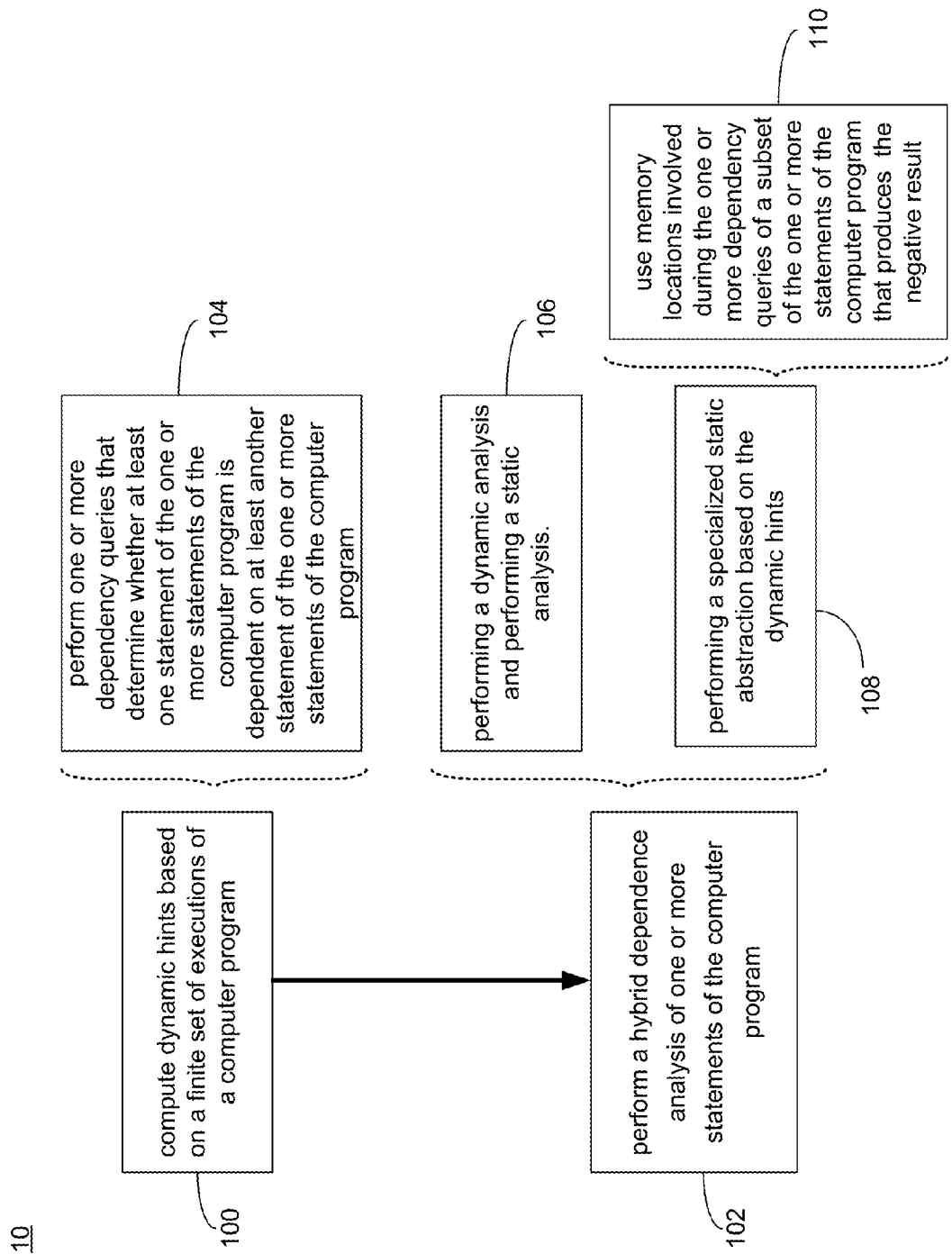
FIG. 2 is a flowchart of a process executed by the hybrid dependency analysis process of FIG. 1.

Referring to FIG. 2, and as will be discussed in greater detail below, HDA process 10 may compute 100 one or more dynamic hints based on a finite set of executions of a computer program. HDA process 10 may also perform 102 a hybrid dependence analysis of one or more statements of the computer program.

HDA process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of HDA process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to an automated software testing application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a notebook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access HDA process 10 directly through network 14 or through secondary network 18. Further, HDA process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

In some embodiments, HDA process 10 may communicate with, interact with, and/or include a component or module of an automated software testing application (e.g., test framework application 54). In an embodiment, test framework application 54 may facilitate automated software testing. For example, test framework application may allow authoring and execution of software tests, e.g., that may be run via test framework application 54, a client application (e.g., one or more of client applications 10c1-10c4, which may include web browsers and/or other suitable applications). One or more of users 36, 38, 40, 42 may access test framework application 54 via one or more respective client electronic devices (e.g., client electronic devices 28, 30, 32, 34) to author and/or execute a software test, e.g., of a user interface, etc.

As generally discussed above, HDA process 10 may generally perform a dependency analysis of various statements in a software program that determines whether these statements are dependent on one another. For example, one statement might eventually modify a prior statement or one statement might result in a different output depending on another statement in the software program. The dependence analysis captures the flow of data that needs to be looked at and makes a decision whether it meets defined dependency criteria.

In some implementations, HDA process 10 may be performed by a combination of sound static analysis and dynamic analysis. The dynamic analysis may provide hints (e.g., dynamic hints) that may be used as inputs into the sound static analysis. For example, running a software program using a number of inputs and performing a query to determine if two statements are dependent of each other. The result of the query for each input may be observed and recorded in a graph from which a subset of query results may be used as inputs into the sound static analysis. The sound static analysis may use an abstraction technique on the subset of query results to form the hybrid analysis.

Soundness of a static analysis may include a static analysis that may result in certain outcome while running the software program using a number of inputs. A static analysis may be considered sound, when two statements are found to be dependent on each other, then the static analysis will likely to report a dependency. In other words, if no dependency was found between two statements, then no execution of the software program using the inputs would show a dependency between these two statements. Unsoundness of a static analysis may include a circumstance in which the static analysis may give a solution however that solution may not reflect a possible dependency between two statements across all possible executions of the software program.

As discussed above, HDA process 10 may compute 100 one or more dynamic hints based on a finite set of executions of a computer program. HDA process 10 may also perform 102 a hybrid dependence analysis of one or more statements of the computer program.

Figure 3:
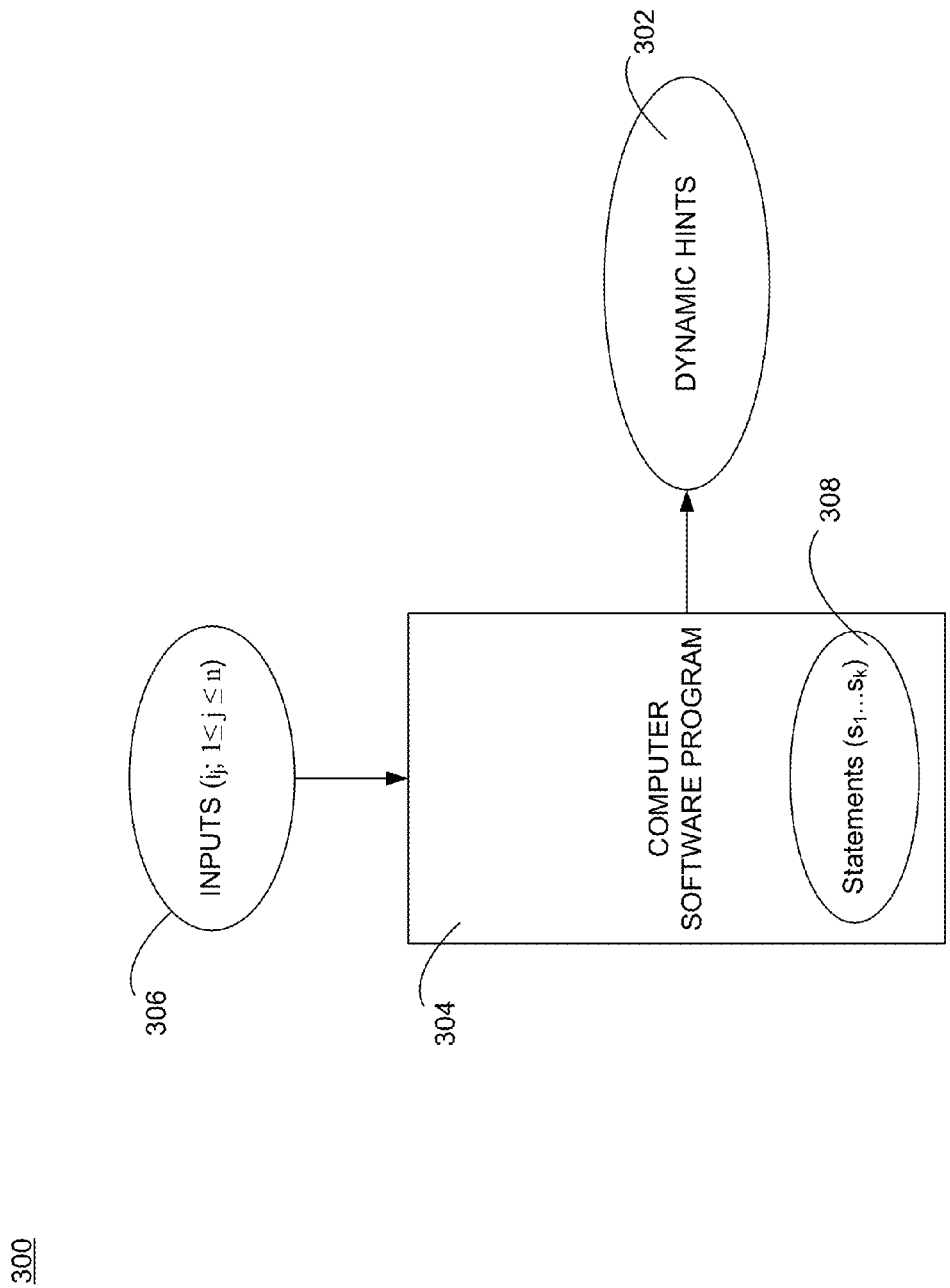
FIG. 3 is a diagrammatic view of an aspect of an implementation of the hybrid dependency analysis process.

HDA process 10 may compute 100 the one or more dynamic hints based on a finite set of executions of a computer program. For example, and referring also to FIG. 3, HDA process 10 may computer 100 the dynamic hints by executing a dynamic analysis (e.g., dynamic analysis 300) to generate dynamic hints (e.g., dynamic hints 302), which may be based on the result of executing a computer software program being analyzed (e.g., computer software program 304) using a finite number of inputs (e.g., inputs 306) that may be used as input into computer software program 304. For illustrative purposes, inputs 306 may be designated as inputs $i_j$, $1 \leq j \leq n$, where n may be a number which may indicate a finite set of computer software program executions. The computer software program may have a number of computer statements (e.g., statements 308). For illustrative purposes, statements 308 may be designated as $s_1$ to $s_k$, where k is a finite number. The computer statements may be lines of code in a computer software program (e.g., computer software program 304). While execution of the computer software program may include inputs (e.g., inputs 306) and one computer software program (e.g., computer software program 304) and results in dynamic hints (e.g., dynamic hints 302), it will be appreciated that this is not a limitation but only for illustrative purposes. The n inputs of 306 may be used as inputs into more than on computer software program during the computation of the dynamic hints which may result in m dynamic hints, where m is a finite number. As will be describe in more detail, dynamic hints may be the results performing queries within the computer software program (e.g., computer software program 304), where the queries may be based on dependencies between statements (e.g., statements 308) in the computer software program (e.g., computer software program 304).

As generally discussed above, the dynamic hints (e.g. dynamic hints 302) may be produced by dynamic analysis 300. The dynamic analysis may be performed on one or more dynamic executions of the computer program, using one or more inputs to the computer program. For example, dynamic analysis 300 may be performed by executing computer software program 304 using inputs 306 (i.e. as inputs $i_j$: $1 \leq j \leq n$). The outcome of computer software program may result in dynamic hints. As stated above, the dynamic hints may be the result of performing dependencies queries on the computer statements (e.g., 308). The outcome of the queries may be used in order to generate the dynamic hints. The generation of the dynamic hints will be explained in more detail below.

In an embodiment, the dynamic hints may be computed by performing 104 one or more dependency queries to determine whether at least one statement of the one or more statements (e.g., statement 308) of the computer program is dependent on at least another statement of the one or more statements of the computer program. For example, computer software program 304 maybe executed on finite set of inputs (e.g., inputs 306). Further, a set of queries, having as parameters computer statements (e.g., statements 308), may be performed in order get a result. The queries may be in form of one or more dependency queries between at least two computer statements 308 (e.g., $s_1$ to $s_k$, where k is a finite number). For example, the dependency query may have computer statement $s_1$ and $s_2$ as parameters. Statements s1 and $s_2$ may be represented to the dependency query in the form $(s_1, s_2)$. It is understood that although computer statements may be represented as $(s_1, s_2)$, this is only for illustrative purposes only and other representation may be used. For each input $i_j$, $1 \leq j \leq n$, a dependence graph may be computed over trace P(i). It understood that other representation of a dependence result may be used and the above dependence graph is only for illustrative purposes. In some embodiments, the solution of a dependence analysis may be represented as a graph structure, G=(V, E), where:

V may be the set of program points of interest; and
edge $e=(v_1,v_2)$ may be an element of E if and only if $v_1$ is data dependent on $v_2$;
i.e., there is a memory location that is accessed by both $v_1$ and $v_2$, and at least one of them writes it.

Figure 4A:
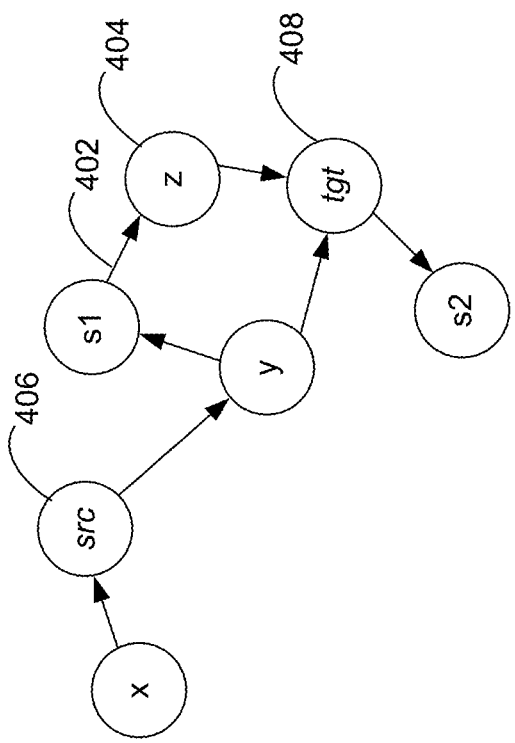
FIG. 4a is a diagrammatic view of an aspect of an implementation of a directed acyclic diagram.
Figure 4B:
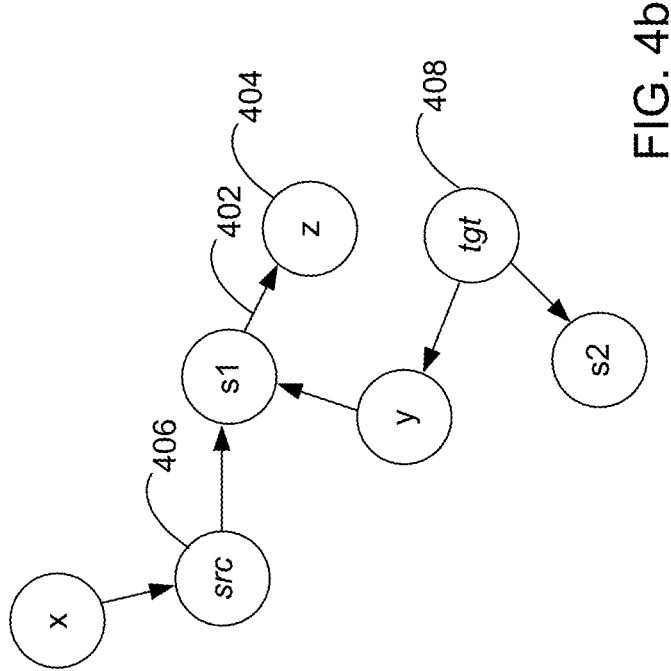
FIG. 4b is a diagrammatic view of an aspect of an implementation of a directed acyclic diagram.

In some embodiments, there are three types of dependencies, Read-After-Write (RAW), Write-After-Read (WAR) and Write-After-Write (WAW). For the purposes of this disclosure all types of dependencies may be treated uniformly. Referring to FIGS. 4a and 4b, a directed graph (V; E) may consist of a set of vertices, V (e.g., vertices 402), and a set of directed edges, E (e.g., edges 404).

Each of the one or more dependency queries may produce a result that may be either a positive result or a negative result. The positive result may indicate dependence between the one or more statements involved in the hybrid dependence analysis. The negative result may indicate independence between the one or more statements involved in HDA process 10. Referring to FIG. 4a, there is shown a directed acyclic graph (DAG) representation of a positive result for the query of whether computer software program statements $s_1$ and $s_2$ are dependent. Referring also to FIG. 4b, there is shown a directed acyclic graph (DAG) representation of a negative result for the query of whether computer software program statements $s_1$ and $s_2$ are dependent. For example, x→y may denote transitive reachability from x to y via dependence edges. In other words, x→y denotes the path to reach y from x on a DAG.

As explained above, there may be two possibilities; either the query returns a positive or a negative answer to the query of whether computer statements (e.g., s1 and $s_2$) are dependent. For example, $s_1$ and $s_2$ may be found to be dependent if there is an index $1 \leq j \leq n$, such that trace $P(i_j)$ shows $s_1$ to be dependent on $s_2$. In that case, the analysis may respond with a positive answer to the query. Consequently, it may not be necessary to continue the dependency analysis of $s_1$ and $s_2$ because the result may have been established that for an input $i_j$, $s_1$ and $s_2$ are found to be dependent of each other. It is understood that although the dependency queries are between $s_1$ and $s_2$, this is only for illustrative purposes and other computer statements (i.e. statement 308: $s_1$ to $s_k$, k being a finite number) may be used as parameters to the dependency query.

As explained above, HDA process 10 may also perform 102 a hybrid dependence analysis of one or more statements of the computer program. As will be described in more detail, HDA process 10 may include a combination of a sound static analysis and a dynamic analysis (e.g., dynamic analysis 300). The dynamic analysis may provide one or more dynamic hints that may become inputs to the sound static analysis. For example, running a computer software program (e.g., computer software program 304) using a number of inputs and performing a query to determine if at least two computer statements 308 (e.g., $s_1$ to $s_k$, where k is a finite number) are dependent on each other. As will be described later, the sound static analysis may use an abstraction technique on the subset of query results to form the hybrid analysis. It is understood that the above are only examples and the HDA process 10 may be performed by other means.

The hybrid dependence analysis may perform 106 a combination of a dynamic analysis (e.g., dynamic analysis' 300) and a sound static analysis. Sound static analysis may be a static dependency analysis of a computer software program (e.g., computer software program 304) that may be performed without actually executing the computer software program. Static dependence analysis may be complicated; especially when considering modern object-oriented (OO) software, which may typically span millions of lines of sophisticated library code, consist of multiple abstraction layers, and make wide use of OO concepts such as encapsulation and polymorphism. Some, and/or all, these challenges may be addressed to a reasonable degree given that the analysis may be sufficiently precise in its modeling of the concrete memory. In some circumstances, defining the set of abstract memory locations to be tracked and maintained by the analysis may present challenges, such that it may still scale to real-world programs.

As explained above, dynamic analysis 300 may be performed on one or more executions of the computer program (e.g., 304), using one or more inputs (e.g., inputs 306) to the computer program. For example, dynamic analysis 300 may be performed by executing computer software program (e.g., computer software program 304) using inputs 306 (i.e. as inputs $i_j$: $1 \leq j \leq n$). HDA process 10 may be based on the one or more dynamic hints (e.g., dynamic hints 302). These dynamic hints may be computed based on a finite set of runs of the subject program (e.g., computer software program 304), and may be then used to specialize the ensuing sound static analysis such that its precision may be boosted without impairing its scalability.

In an embodiment, dynamic hints may be used to perform the sound static analysis. As explained above, dependency queries may produce a result that may be either a positive result or a negative result. The negative result may indicate independence between the one or more statements involved in HDA process 10. For example, there may be two possibilities; either the query returns a positive or a negative answer to the query of whether computer statements 308 (e.g., $s_1$ and $s_2$) are dependent. If for example, the result of the dependence query is a negative result, this may not provide confidence that the two statements (i.e., $s_1$ and $s_2$) are actually independent. There may be other inputs outside the finite inputs used (i.e. inputs $i_j$: $1 \leq j \leq n$) that may result in dependence between $s_1$ and $s_2$. The queries that resulted in a negative result may provide useful hints (e.g., dynamic hints 302) that may be used in the sound static analysis.

HDA process 10 may perform 108 a specialized static abstraction based on the one or more dynamic hints (e.g., dynamic hints 302). For example, dynamic hints 302 may be exploited for building an effective static abstraction. Abstraction may be a process by which concepts are derived from the usage and classification of literal ("real" or "concrete") concepts, first principles, or other methods. Further, abstraction may be a process by which data and programs are defined with a representation similar in form to its meaning (semantics), while hiding away the implementation details. When the result of the dependency query is a negative result, which, as explained above, does not mean that for other than inputs $i_j$, $1 \leq j \leq n$ the result would still be negative (i.e., independent). There may be other inputs outside $1 \leq j \leq n$ that may yield a dependency between $s_1$ and $s_2$ for example. In that case, a specialized static abstraction may be necessary in order to create confidence in the result of the dependency queries. As will be explained in more detail below, the abstraction may be based on concrete memory locations.

In case $s_1$ and $s_2$ are found to be independent for inputs $i_j$, $1 \leq j \leq n$, for each $P(i_j)$ the analysis may have a precise notion of the memory locations involved in the subgraph of $P(i_j)$ whose source may be statement src (i.e., 406) and whose target may be tgt (i.e. 408). Src and tgt may be statements of a computer software program (e.g., computer software program 304). Src and tgt may be part of a dependency query of whether src is dependent on tgt. This information may then be used to form a specialized abstraction of the concrete memory locations that may be effective when reasoning about query (tgt, src). It is understood that the above is only for illustrative purposes only and other means of abstraction may be used.

In another embodiment, HDA process 10 may use 110 memory locations involved during the one or more dependency queries of a subset of the one or more statements of the computer program that produces the negative result when HDA process 10 performs 108 the specialized static abstraction based on dynamic hints. As explained above, the concrete memory locations that may be effective when reasoning about query (tgt, src) may be used to form a specialized abstraction. Although other representation may be implemented, below is an example implementation of the specialized static abstraction and is only for illustrative purposes.

Consider a set $\{P(i_j): 1 \leq j \leq n\}$ of traces of inputs (e.g., $i_j$: $1 \leq j \leq n$) and let $G[P(i_j)]$ be the dynamic dependence graph corresponding to trace $P(i_j)$. This graph may exhibit dependencies between statements (i.e., statement 308) in the computer software program (e.g., computer software program 304) based only on the information in trace $P(i_j)$. Considering input query (tgt,src), denote the subgraph of $G[P(i_j)]$, whose source is src, by $G[P(i_j),src]$. $G[P(i_j),src]=(V',E')$ is a directed acyclic graph (DAG) where:
  $V'=\{v \in V: v \rightarrow src\}$; and
  $E'=\{e=(v_1,v_2) \in E: v_1,v_2 \in V'\}$, Tgt may be absent from $G[P(ij),src]$ for all $1 \leq j \leq n$, since otherwise a positive answer may have been returned based on the dependence query performed above.

For illustrative purposes only, assume that edges in $G[P(i_j),src]$ are annotated with sets of dynamic memory locations, those involved in each dependency. Further, for illustrative purposes, denote by $M[P(i_j),src]$ the set of memory locations participating in $G[P(i_j),src]$ (i.e., appearing on edges in $G[P(i_j),src]$). Then retaining the analysis' precision with regard to the locations in $\cup_{j=1}^{n} M[P(i_j), src]$ may be desired, while treating the remaining memory locations in $\cup_{j=1}^{n} G[P(i_j)]$ in a coarse manner. This is in light of the likely invariant that statement src may not influence statement tgt, which may be born out of n runs of computer software program 304 on representative inputs (i.e. $i_j$: $1 \leq j \leq n$).

Assuming that the inputs chosen for the n runs of the computer software program (e.g., computer software program 304) are indeed representative, memory locations whose value is not influenced by src in any of the n runs may not be relevant for the proof. The remaining memory locations may be, on the other hand, important for the proof: If the analysis treats them coarsely, then it may wrongly reject the proposition that src is independent of tgt. However, memory locations involved in the traces may be incomparable as a result of being dynamic. Abstraction may be needed to normalize between memory locations across different traces. A standard way of performing the normalization may be via the classic allocation-site-based abstraction of concrete objects, where the site where a concrete object is allocated is the object's abstract name. This partitioning of the unbounded set of runtime objects may be finite, and may be refined by taking into account a k-approximation of the call string leading to the allocation site. Although, k-approximation is utilized, other types of approximation algorithms may be used. Approximation algorithms may be, but not limited to, k-approximation, $\rho$-approximation algorithm and r(n)-approximation.

Assuming this base abstraction, a specialized abstraction may be created that discriminates between relevant and irrelevant memory locations (according to $\{P(i_j): 1 \leq j \leq n\}$) as explained above. There are two classes of memory locations, heap locations and environment locations. Under specialization, each of the categories may be explained as:

A heap location is of the form (o,e), where o is the base object and e is either an index if the base object is an array (array index), or a field identifier if o is a non-array object (object field). For each heap location (o,e) in $\cup_{j=1}^{n} M[P(i_j), src]$, we use a refined abstraction of o (i.e., a value of k that is $\geq 1$). All other heap locations may be mapped to a privileged abstract element dubbed glob.

An environment location corresponds to a local variable identifier v in the context of a particular stack frame, and is thus of the form $(v,(m_1, \ldots, m_w))$. Note that local variables may not have changed under the above abstraction, and so there may be no need for any special treatment of this category of memory locations.

Specialization may help when using glob (i.e., global) in place of multiple abstract memory locations. Glob may reflect future knowledge of which memory locations would matter when reasoning about the proposition that src is independent of tgt, which may be made possible thanks to the dynamic hints. Dynamic information may indicate which abstract locations to map to glob, and hence may play a role in letting the analysis use an affordable abstraction, and may still compute a more precise solution. The dynamic analysis thus may play a predictive role. However, predication may have errors especially given the fact that the prediction may be based on finite runs of the program. Glob may enable the analysis to err on the safe side, since the information loss it embodies can only cause the analysis to reject a valid independence proposition, but not vice versa.

Figure 5:
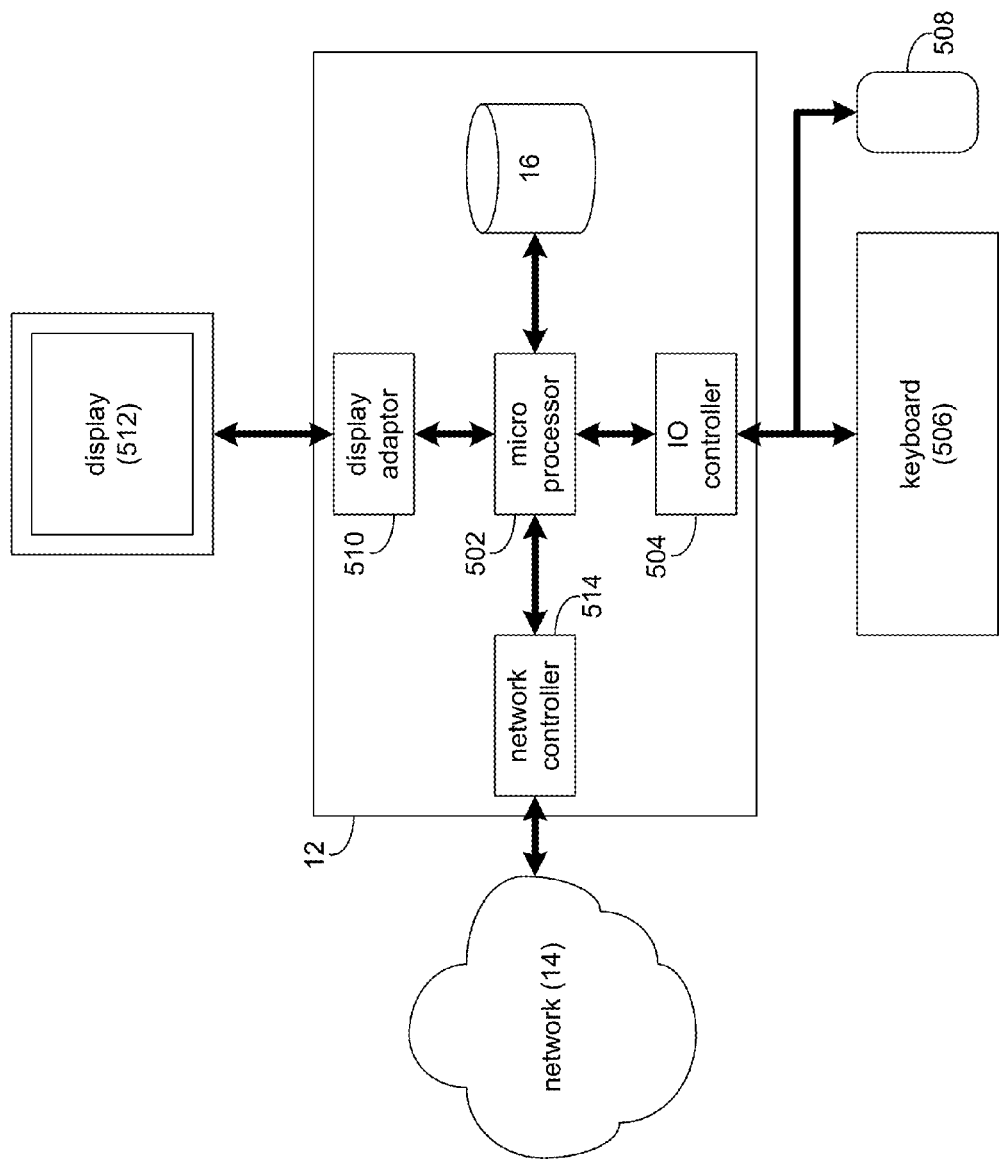
FIG. 5 is a diagrammatic view of the computing device of FIG. 1, according to an implementation of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, HDA process 10 may be substituted for computing device 12 within FIG. 5, examples of which may include but are not limited to client electronic devices 28, 30, 32, 34.

Computing system 12 may include microprocessor 502 configured to e.g., process data and execute instructions/code for screen capture process 10. Microprocessor 502 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 504 may be configured to couple microprocessor 502 with various devices, such as keyboard 506, mouse 508, USB ports (not shown), and printer ports (not shown). Display adaptor 510 may be configured to couple display 512 (e.g., a CRT or LCD monitor) with microprocessor 502, while network adapter 514 (e.g., an Ethernet adapter) may be configured to couple microprocessor 502 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 502) of a general purpose computer/special purpose computer/other programmable data processing apparatus (e.g., computing device 12), such that the instructions, which execute via the processor (e.g., processor 502) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
computing, by one or more computing devices, one or more dynamic hints based on a finite set of executions of a computer program;
performing, by the one or more computing devices, a hybrid dependence analysis of one or more statements of the computer program, including performing a specialized static abstraction to create confidence in a result of one or more dependency queries, wherein the specialized static abstraction is based upon, at least in part, memory locations and the one or more dynamic hints; and
normalizing, by the one or more computing devices, the memory locations across different traces of the finite set of executions of the computer program based upon, at least in part, the specialized static abstraction.

2. The computer-implemented method of claim 1 wherein performing the hybrid dependence analysis includes a combination of performing a dynamic analysis and performing a sound static analysis.

3. The computer-implemented method of claim 2 wherein the one or more dynamic hints are used to perform the sound static analysis.

4. The computer-implemented method of claim 2 wherein the one or more dynamic hints are produced by the dynamic analysis, wherein the dynamic analysis is performed on one or more dynamic executions of the computer program, using one or more inputs to the computer program.

5. The computer-implemented method of claim 3 wherein computing the one or more dynamic hints further includes performing the one or more dependency queries that determine whether at least one statement of the one or more statements of the computer program is dependent on at least another statement of the one or more statements of the computer program.

6. The computer-implemented method of claim 5 wherein each of the one or more dependency queries produces a result that is one of a positive result and a negative result, wherein the positive result indicates dependence between the one or more statements involved in the hybrid dependence analysis and the negative result indicates independence between the one or more statements involved in the hybrid dependence analysis.

7. The computer-implemented method of claim 6 wherein performing the specialized static abstraction includes using the memory locations involved during the one or more dependency queries of a subset of the one or more statements of the computer program that produces the negative result.

* * * * *